(12) United States Patent
Felten

(10) Patent No.: US 6,723,195 B1
(45) Date of Patent: Apr. 20, 2004

(54) ADJUSTABLE TIRE BUILDING CONTOUR DRUM AND METHOD OF BUILDING TIRE THEREON

(75) Inventor: Gilbert Alphonse Felten, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/869,767

(22) PCT Filed: Feb. 3, 1999

(86) PCT No.: PCT/US99/02269

§ 371 (c)(1),
(2), (4) Date: Jul. 9, 2001

(87) PCT Pub. No.: WO00/46018

PCT Pub. Date: Aug. 10, 2000

(51) Int. Cl.[7] .......................... B29D 30/24; B29D 30/70
(52) U.S. Cl. ....................... 156/133; 156/123; 156/414; 156/417
(58) Field of Search .......................... 156/123, 130, 156/130.7, 133, 134, 414, 415, 416, 417–420, 405.1, 406.4

(56) References Cited

U.S. PATENT DOCUMENTS

| | | | |
|---|---|---|---|
| 4,129,927 A | | 12/1978 | Anderson |
| 4,555,287 A | | 11/1985 | Goodfellow |
| 4,683,021 A | * | 7/1987 | Stalter et al. ............... 156/415 |
| 4,780,170 A | * | 10/1988 | Landsness ................. 156/416 |
| 4,846,907 A | * | 7/1989 | Kumagai et al. ........... 156/130 |
| 4,859,272 A | | 8/1989 | Lovell et al. |
| 6,142,205 A | * | 11/2000 | Beck, Jr. et al. ............ 152/542 |

FOREIGN PATENT DOCUMENTS

| | | |
|---|---|---|
| DE | 39 08 502 | 9/1990 |
| GB | 2253818 | 9/1992 |
| JP | 7-24931 | 1/1995 |

* cited by examiner

Primary Examiner—Geoffrey L. Knable
(74) Attorney, Agent, or Firm—Howard M. Cohn

(57) ABSTRACT

This invention relates to a segmental tire building drum (10) for laminating tire components (103, 106) having a plurality of circumferentially spaced, radially movable base segments (30) each having a secondary segment (50) radially movable relative to the base segment for providing a cylindrical flat surface to support each of the tire components as it is applied and spliced on the building drum and to compensate for thickened edges of the tire components applied to the tire building drum.

8 Claims, 4 Drawing Sheets

ADJUSTABLE TIRE BUILDING CONTOUR DRUM AND METHOD OF BUILDING TIRE THEREON

TECHNICAL FIELD

This invention relates to a method of laminating tire components on a segmental tire building drum which has a plurality of circumferentially spaced, radially movable base segments, each of which has a secondary segment that is radially movable relative to the base segment. This construction provides a crowned surface on the drum to compensate for the thick edges of the components which are applied to the drum and for supporting each of the tire components as it is applied and spliced on the drum.

BACKGROUND OF THE INVENTION

In building tire breaker/belt packages including breaker plies and belt plies, the breaker plies are cut to length and after application to the green tire carcass, butt spliced together. Preferably, each breaker ply is spliced on a cylindrical, flat surface. With conventional cylindrical tire building drums, this is not always possible because the edges of the breaker plies are surrounded by gum strips and as the breaker plies are applied and laminated, the diameter gauge difference between the edges and the center of the belt plies creates a concave surface instead of a cylindrical flat surface as needed for a satisfactory butt splice of the breaker plies. This problem, i.e. wherein the edges and center of the plies are of a different diameter, is of special concern in the efficient automated building of breaker/belt packages, where the breakers are precut to a predetermined length so they can be applied to the drum without stretching them.

In the past, expandable tire building drums have been proposed, such as that shown in U.S. Pat. No. 4,129,927 ('927), where the drum shoulders have been adjustable. However, the drum disclosed in the '927 patent and other expandable drums known in the art have not disclosed adjusting the contour of the drum with center segments that can be repositioned during application of the various belt components in order to provide a flat application surface for each component in accordance with the present invention.

OBJECTS OF THE INVENTION

An object of the present invention is to provide a tire building drum with an adjustable contour and a method of building a tire on the improved building drum as defined in one or more of the appended claims and, as such, having the capability of being constructed and used to accomplish one or more of the following subsidiary objects.

One object of the present invention is to provide a tire building drum with an adjustable contour and a method of using the drum to form a cylindrical flat surface that supports the tire components as they were applied and spliced on the drum.

SUMMARY OF THE INVENTION

This invention relates to the construction of a tire building drum especially designed to laminate tire components, such as breaker plies, having thickened edges.

In accordance with one aspect of the invention, there is provided a tire building drum for laminating tire components including a plurality of circumferentially spaced, radially movable base segments. Each of the base segments has a radially movable secondary center segment and operative structure for moving the secondary center segment radially outward relative to each of the base segments a predetermined amount to compensate for an increase in thickness of the edges of the laminated tire components applied to the tire building drum.

In accordance with another aspect of the invention, the tire building drum with a plurality of circumferentially spaced, radially movable base segments has an inner cylindrical drum hub mounted for rotation and an outer cylindrical drum support disposed radially outward from the inner cylindrical drum hub and connected thereto by a circular support plate. Inflatable bladders are disposed between the base segments and the base drum support for urging the base segments radially outward. Each of the base segments has an end flange with an axially extending channel member for retaining a garter spring that extends around the drum hub to urge the base segments radially inward. The base segments also have stop flanges connected to the drum hub and engageable by each channel member for limiting the radially outward movement of each base segment. A nut member is slidably mounted in each base segment and fastened to the secondary center segment for moving the secondary center segment radially inward and outward. A multiple splined shaft member is rotatably mounted on the base segment and threaded in the nut member for radially moving the nut member and the secondary segment. The shaft member is slidably contained in a grooved sleeve member and engageable with a beveled ring slidably mounted on the drum hub. A first ring gear is connected to the beveled ring and is engageable with a spur gear on a shaft extending axially to a second spur gear engageable with gear teeth of positive drive belt pulleys. The latter drive belt pulleys are connected by a differential pulley, which in turn is driven by a servomotor in response to signals from an encoder.

In accordance with still another aspect of the invention, there is provided a method of laminating and splicing tire components having thickened edges on a tire building drum comprising the following steps. A first tire component is placed on a first flat cylindrical drum surface of the building drum of a first diameter and the ends are butt spliced together. The diameter of a center section of the cylindrical drum is increased to position the first tire component to form a second flat cylindrical surface of a second diameter. A second tire component is placed on the second flat cylindrical surface and the opposite ends of the second component are butt spliced together. Next, the diameter of the center section of the drum is increased to position the second tire component to form a third flat cylindrical surface of a third diameter. Then, a third tire component is placed on the third flat cylindrical surface and the ends of the third tire component are butt spliced together.

The method can also include the following steps. The first, second and third tire components are laminated together. The diameter of the tire building drum is decreased the laminated tire components are removed from the tire building drum.

Other objects, features and advantages of the invention will become apparent to those skilled in the are to which it pertains upon a reading and understanding of the following detailed description.

BRIEF DESCRIPTION OF THE DRAWINGS

The structure, operation and advantages of the invention will become further apparent upon consideration of the following description taken in conjunction with the accompanying drawings, wherein.

DETAILED DESCRIPTION OF THE INVENTION

Figure 1:
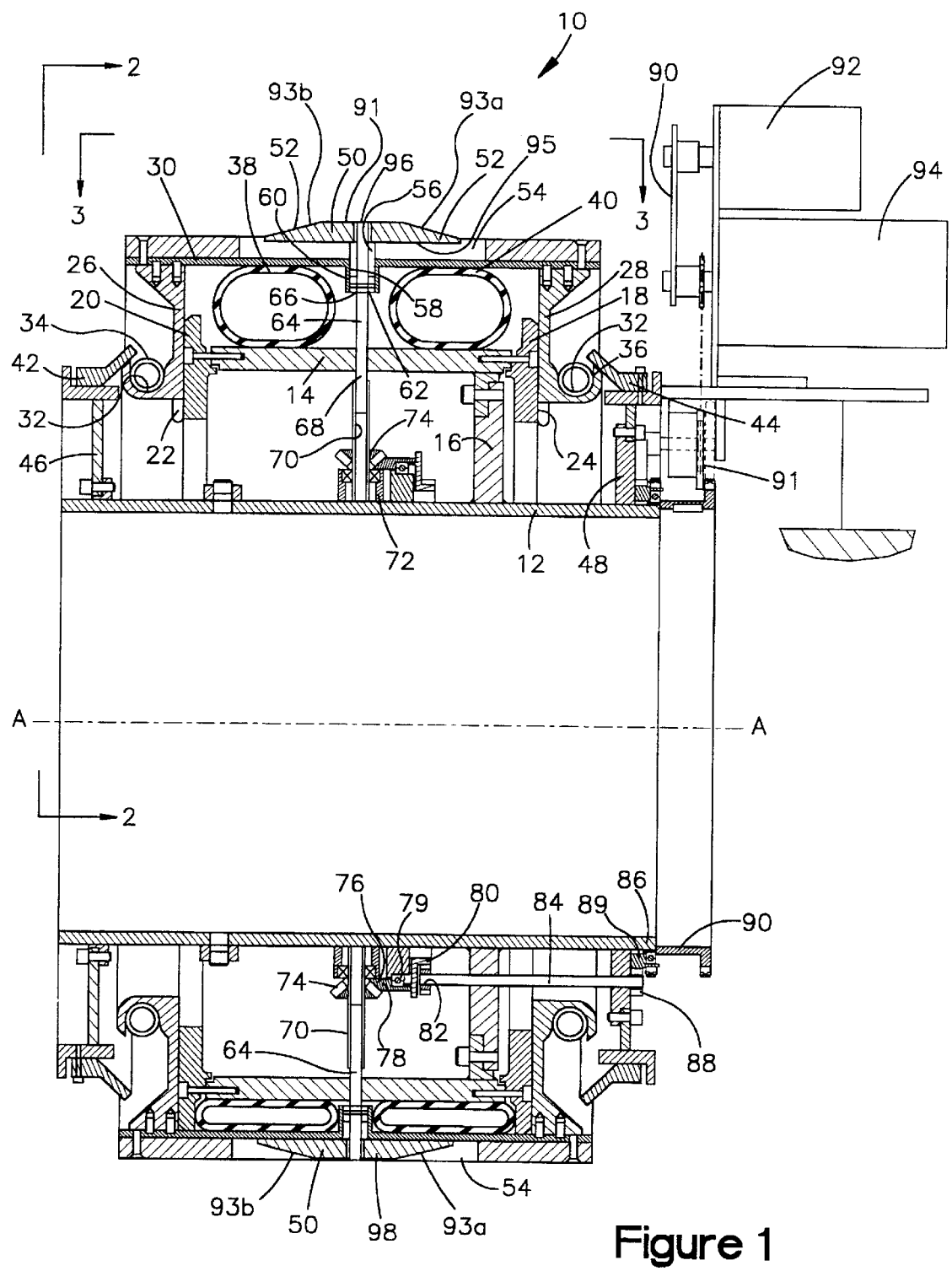
FIG. 1 is a schematic illustration, partially in cross section, of a tire building drum embodying the invention and showing the base segments and the center segments in the expanded condition and the lower half showing the secondary center segment in the contracted position.
Figure 2:
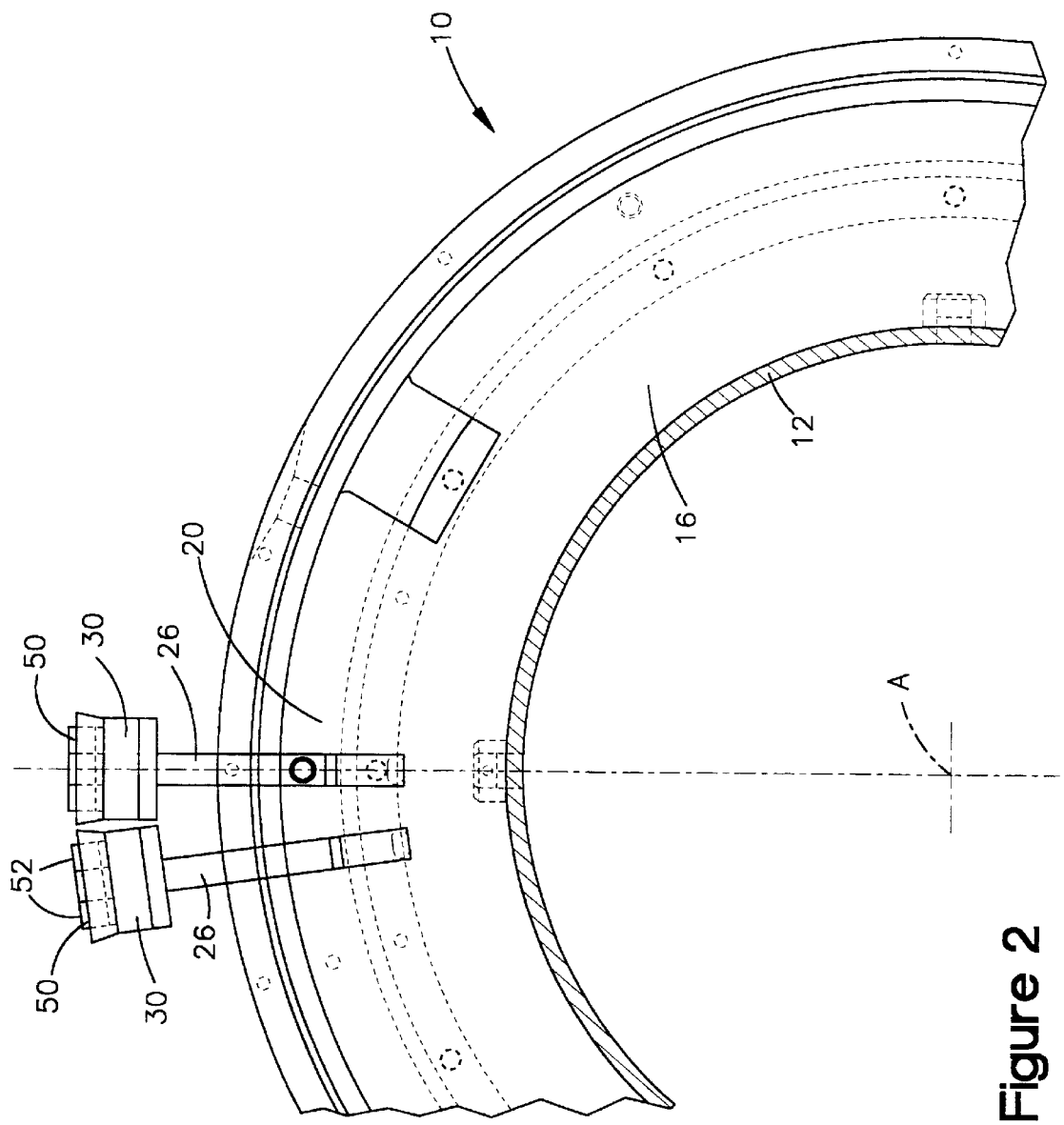
FIG. 2 is a partial, sectional view taken along the line 2—2 in FIG. 1, with parts being broken away.
Figure 3:
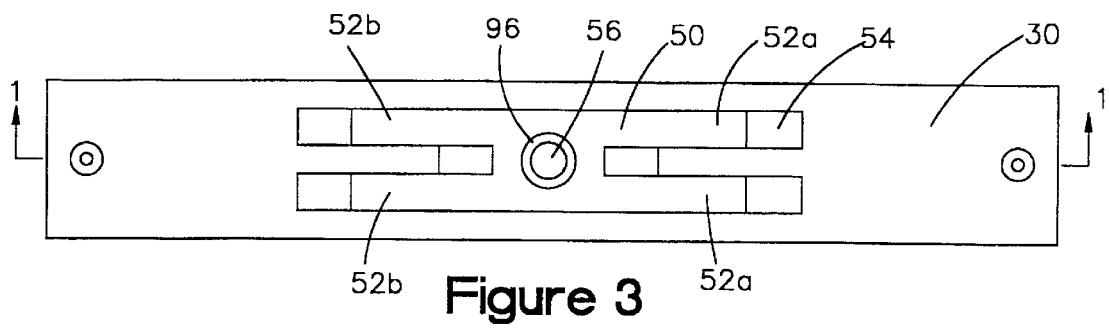
FIG. 3 is a plan view taken along the line 3—3 in FIG. 1 showing one of the base segments and a corresponding center segment.

Referring to FIGS. 1 and 2, a tire building drum 10 is shown having a cylindrical drum hub 12 mounted for rotation about an axis A—A on a suitable housing (not shown). A cylindrical drum support 14 is bolted to a circular support plate 16, which may be fastened to the drum hub 12 by any suitable means such as by welding. Circular end plate guides 18 and 20 are mounted on the drum support 14 and have slots 22 and 24 for receiving radially extending, end hooked pieces 26 and 28 of base segments 30. Channels 32 and 33 at the inner diameter of the end pieces 26 and 28, respectively, are provided for receiving garter springs 34 and 36 for urging the base segments 30 radially inward. Inflatable bladders 38 and 40, which may be annular and in communication with the source of air pressure, are positioned between the drum support 14 and the base segments 30 to move the base segments radially outward. Stop flanges 42 and 44 are mounted on flanges 46 and 48, respectively, which in turn are fastened to the drum hub 12 for limiting the outward movement of the base segments 30.

In accordance with the present invention, secondary center segments 50 having arms 52a, 52b are removably attached in a slotted opening 54 in each of the base segments 30 by an attachment member, such as a nut member 56. Each of the nut members 56 is slidably mounted in a cylindrical opening 58 in a base segment cup 60. The cup 60 has a bottom plate 62 with an opening for a shaft 64 and a threaded portion (not shown) for engaging the threads (not shown) of the nut member 56 in a portion 65 of the interface of the cup and the nut member. Stop washers 66 prevent relative axial movement of the shaft 64 and the base segment 30. The shaft 64 may also have a splined section 68 in sliding engagement with a grooved sleeve 70, rotatably mounted in bearings 72a and 72b. The bearings 72a and 72b in turn are mounted on the drum hub 12 at circumferentially spaced apart positions corresponding to the circumferentially spaced base segments 30 and secondary center segments 50.

As seen more clearly in the bottom half of FIG. 1, each of the sleeves 70 has a beveled gear 74 engageable with a beveled gear teeth on a ring gear 78. Gear 78, in turn, is mounted against a bearing 79 for rotation about the drum hub 12 and has a second circular gear flange 80 with teeth engageable with a spur gear 82 mounted on a drum shaft 84. Shaft 84 extends outwardly to an edge 86 of the drum hub 12 and is mounted to a second spur gear 88. Gear 88, in turn, is positioned for engagement with a conventional drive connection including a driven differential ring 89 connected by chain drive 91 to a differential pulley 90. An encoder 92 and a servomotor 94 may be connected to the differential pulley 90. The servomotor 94 rotates pulley 90 and differential ring 89 causing spur gear 88 to rotate shaft 84. Shaft 84 then causes the ring gear 78 to rotate beveled gear 74 which in turn causes the sleeve 70 to rotate shaft 64. This rotation of the shaft 64 of each of the secondary center segments 50 then causes the nut member 56, which is threaded on the shaft, to move radially outward or inward from axis A—A as determined by the encoder 92 and direction of movement of servomotor 94.

The nut members 56 have a removable clip connection 96 to quickly change secondary center segments 50 so as to provide different widths, different angles and different radial thicknesses for different tire building applications. Each of the secondary center segments 50 has a central flat surface 91, side surfaces 93a, 93b and a bottom surface 95. Preferably the secondary center segments 50 have a thickness at the center portion 98, between outer surface 91 and bottom surface 95, substantially equal to the depth of the slotted openings 54. Further, side surfaces 93a, 93b of segments 50 are tapered outwardly from an initial greater central radius $R_s$ with respect to the central axis A—A to a lesser radius $R_2$, $R_3$, etc. with respect to the central axis along the side surfaces 93a, 93b to provide a flat surface for the application of plies with thickened edges by moving center segments outward into the expanded condition.

Figure 4:
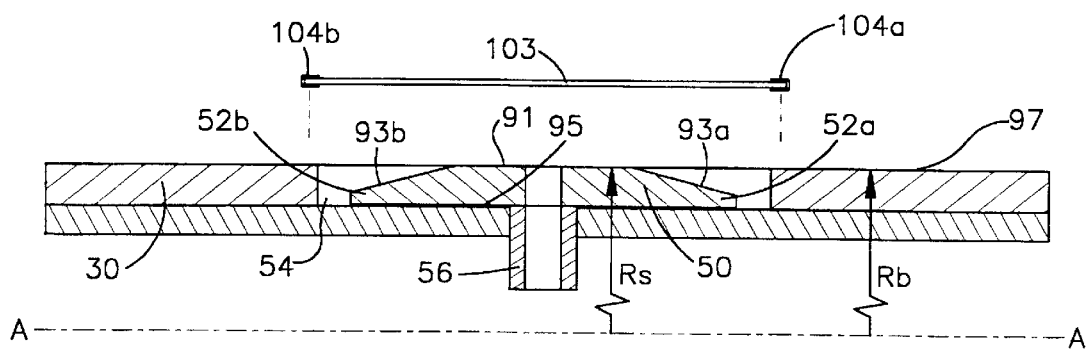
FIGS. 4–9 are schematic cross sections of one of the base segments and a center segment showing the steps of applying the components of a breaker/belt package and illustrating the relative position of the center segment during the steps of building a tire.

In operation, as illustrated in FIGS. 4–9, the tire components are laminated or applied, for example, in the following steps:

For example, as shown in FIG. 4, the first tire components, such as a breaker ply 103 with edges thickened with gum strips 104a, 104b about either edge, is applied onto drum 10. The secondary center segments 50 are in the retracted position, so that the radius Rs of the surface 91 of each of the secondary center segments 50 has a radius Rs substantially equal to the radius Rb of the base segments 30 to form a flat cylindrical drum surface 97.

Figure 5:
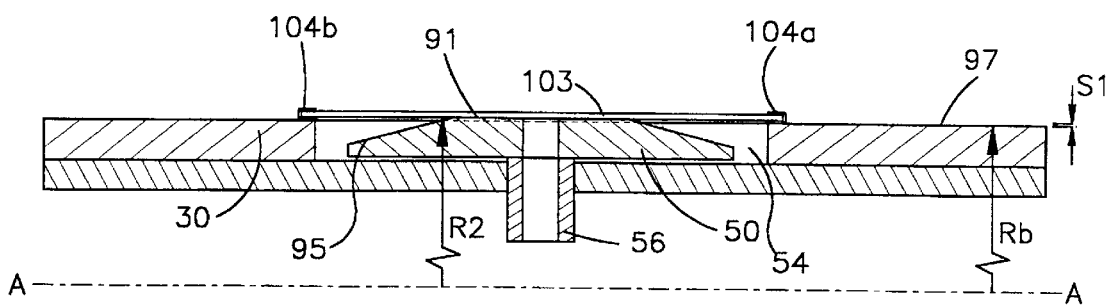

Referring to FIG. 5, the shaft 64 is rotated, causing the nut members 56 to move radially outward and move the outer surface 91 of secondary center segments 50 to a location within a radius R2 equal to Rb+S1. This compensates for the thicker edges of breaker ply 103 so that the ply 103 forms a substantially cylindrical flat surface for applying the next tire component, which may be a breaker ply 106 having gum strips 107a, 107b wrapped around the ends thereof. It is important that breaker ply 106 be butt spliced on a flat surface which can now be accomplished since the center of breaker ply 103 has been moved to a radial position which is the same as that of the ends covered with gum strips 104a, 104b.

As long as the servomotor is not moving, drum differential pulley 90 will rotate drum hub 12 and the center segment 50 together. However, if motor 92 drives shaft 84, as previously described, the center segment 50 can be moved radially inward or outward with respect to axis A—A.

Figure 6:
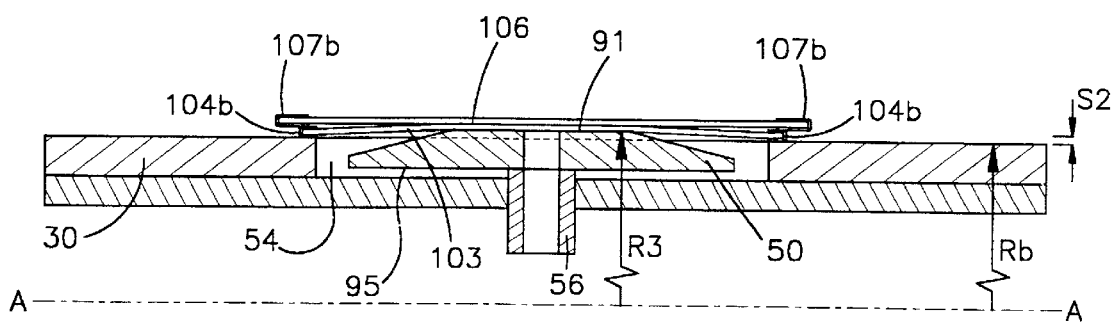

As shown in FIG. 6, the breaker ply 106 with gum strips 107a, 107b about either edge is applied onto breaker ply 103. In order to compensate for the increased thickness caused by gum strips 107a, 107b, the secondary center segments 50 are moved an additional amount 52 radially outward so that outer surface 91 is at a radial location R3, where radius R3 equals Rb+S1+S2 to shape ply 103 into a flat cylindrical surface for applying and splicing the ends of the second breaker ply 106.

Figure 7:
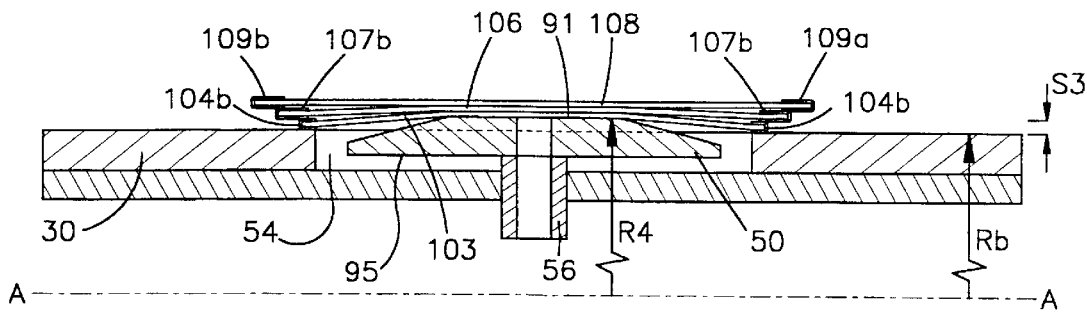

Referring to FIG. 7, the second breaker ply 106 with edge strips 107a, 107b have been applied and a third breaker ply 108 with edge gum strips 109a, 109b is applied on the substantially flat cylindrical surface provided by increasing the radius of the secondary center segments 50 by a distance S3 so that radius R4 of top surface 91 is equal to Rb+S1+S2+S3.

Figure 8:
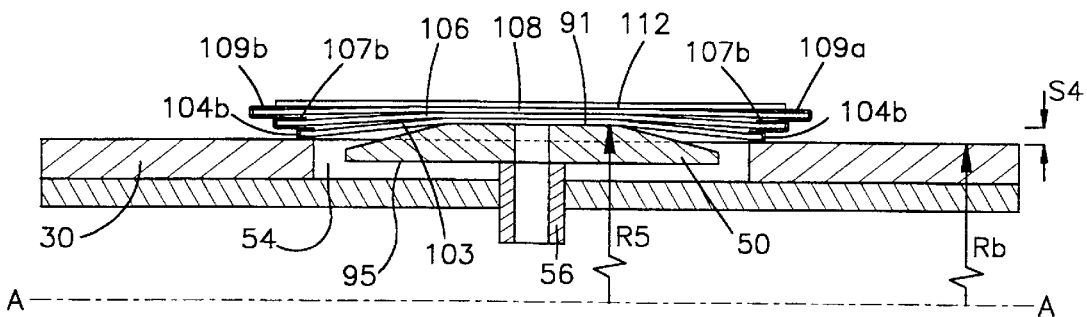

Referring to FIG. 8, the secondary center segments 50 are moved further radially outward a distance S4 so that Radius R5 of the top surface 91 is equal to Rb+S1+S2+S3+S4 to provide a substantially flat cylindrical surface for applying a final tire component 112.

Figure 9:
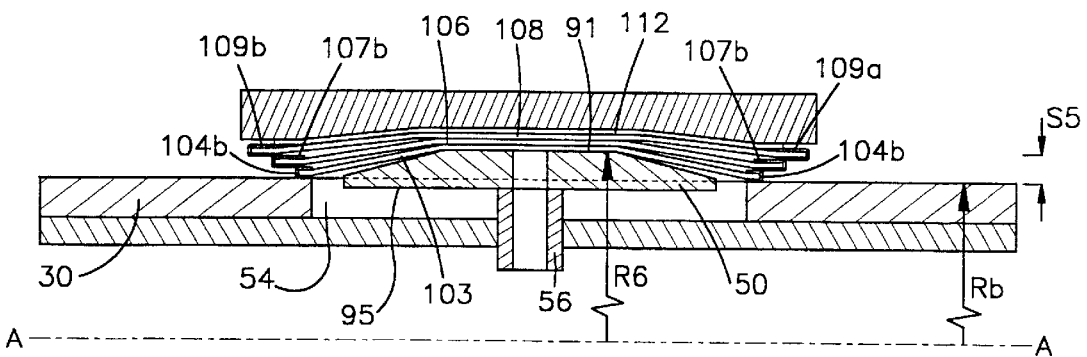

Referring to FIG. 9, it is desirable in the manufacture of certain tires to provide a crowned drum surface, against which the laminated assembly 114 that includes ply elements 103, 106, 108, and 112, may be stitched as by conventional stitcher 116. For this purpose, the secondary center segments 50 are moved outward a further radial distance S5, by rotating the shaft 64 a predetermined amount as determined by the encoder 92. Then radius R6 of the top surface 91 of the center segments 50 is equal to Rb+S1+S2+S3+S4+S5.

After the laminated assembly 114 is stitched, the secondary center segments 50 may be retracted by rotating the shaft 64 of each of the secondary center segments in an opposite direction, retracting the segments back into a position as shown in FIG. 4, whereupon the laminated assembly 114 may be removed from the tire building drum 10 as is conventionally known in the tire building art.

The preferred apparatus and methods have been described hereinabove. It will be apparent to those skilled in the art that the above apparatus and method may incorporate changes and modifications without departing from the general scope of this invention. It is intended to include all such modifications and alterations insofar as they come within the scope of the appended claims, or the equivalence thereof.

What is claimed:

1. A tire building drum for laminating tire components having thickened edges characterized by:

a cylindrical drum hub mounted for rotation about an axis A—A;

a cylindrical drum support mounted to the cylindrical drum hub;

a plurality of circumferentially spaced base segments movably attached to said cylindrical drum support and movable between a retracted position to form a cylindrical drum surface and a radially outward position, each of the base segments having a slotted opening of a desired depth to receive a secondary center segment, each of the secondary center segments being mounted to the base segment so as to move radially outward relative to its corresponding base segment from a retracted position to compensate for an increase in thickness of the edges of the tire components applied to the tire building drum; and each of the secondary center segments having a central flat cylindrical surface formed with a central radius substantially equal to the radius of the base segments to form a flat cylindrical drum surface when the secondary center segments are in the retracted position, the secondary center segments having side surfaces tapering from the central radius to a smaller radius at the outer ends of the side surfaces and a bottom surface, the thickness of the secondary center segments between the central flat cylindrical surface and the bottom surface being substantially equal to the depth of the slotted opening whereby the central flat cylindrical surface of each of the secondary center segments forms the flat cylindrical drum surface with the base segments.

2. The tire building drum according to claim 1 further characterized by each of the secondary center segments being movable radially relative to their respective base segments by an attachment member fastened to the secondary center segments and threaded on a shaft rotatable relative to the attachment member.

3. A tire building drum according to claim 2 further characterized by the shaft being rotatably mounted in the base segments for rotational movement within the base segment.

4. The tire building drum according to claim 3 further characterized by the shaft having a section slidably mounted in a sleeve rotatably attached to a drum shaft, which in turn has a gear operably engaged with a drive component to cause rotation of shaft.

5. The tire building drum according to claim 2 further characterized by the secondary center segment removably fastened to the attachment member to enable replacement of the segment.

6. A method of laminating and splicing tire components having thickened edges on a tire building drum comprising the steps of:

a. providing a building drum having a plurality of circumferentially spaced base segments forming a flat cylindrical drum surface having a radius with respect to axis A—A through the tire building drum, each of the base segments having a slotted opening of a desired depth, each of the base segments having a secondary, radially movable center segment disposed in the slotted opening, the center segments having a central flat cylindrical surface formed with a central radius substantially equal to the radius of the base segments to form a flat cylindrical drum surface when the secondary center segments are in a retracted position;

b. placing a first tire component having thickened edges on the building drum when the secondary center segments are in the retracted position whereby the central flat cylindrical surface of each of the secondary center segments forms the flat cylindrical drum surface with the radially disposed base segments;

c. butt splicing ends of the first tire component;

d. moving the secondary center segments radially outward a distance to locate the cylindrical surface of the secondary center segments at a location with respect to axis A—A where the first tire component forms a flat surface; and e. applying at least a second tire component having thickened edges on the flat surface of first tire component and butt splicing the ends of the second tire component.

7. The method of claim 6 including the step of laminating at least the first and second tire components together.

8. The method of claim 7 including the step of decreasing the radius of the surface of the tire building drum and removing the laminated tire components from the tire building drum.

* * * * *